United States Patent [19]

Flohr et al.

[11] Patent Number: 5,610,964
[45] Date of Patent: Mar. 11, 1997

[54] METHOD FOR IMAGE RECONSTRUCTION IN A COMPUTED TOMOGRAPHY APPARATUS

[75] Inventors: Thomas Flohr, Uehlfeld; Stefan Schaller, Erlangen, both of Germany

[73] Assignee: Siemens Aktiengesellschaft, Munich, Germany

[21] Appl. No.: 682,023

[22] Filed: Jul. 16, 1996

[30] Foreign Application Priority Data

Aug. 1, 1995 [DE] Germany ............................ 19528261.2

[51] Int. Cl.$^6$ ...................................................... A61B 6/03
[52] U.S. Cl. ............................................. 378/15; 378/901
[58] Field of Search ................................. 378/15, 4, 901

[56] References Cited

U.S. PATENT DOCUMENTS 5,528,644  6/1996  Ogawa et al. ......................... 378/901

OTHER PUBLICATIONS

"Image Reconstruction From Linograms: Implementation and Evaluation," Edholm et al., IEEE Trans. On Med. Imaging, vol. 7, No. 3, Sep. 1988, pp. 239–246.

"A Fast Sinc Function Gridding Algorithm For Fourier Inversion in Computer Tomography," O'Sullivan, IEEE Trans. On Med. Imaging, vol. MI–4, No. 4, Dec. 1985.

*Primary Examiner*—Don Wong
*Attorney, Agent, or Firm*—Hill, Steadman & Simpson

[57] ABSTRACT

An image reconstruction method for a computer tomograph produces arbitrary eccentric segments of images. The method is a modified linogram reconstruction, more precisely a combination of linogram and gridding methods, by means of which it is possible to reconstruct arbitrary eccentric segments directly, by producing points directly on a Cartesian grip, without the necessity of transformations or interpolations.

1 Claim, 1 Drawing Sheet

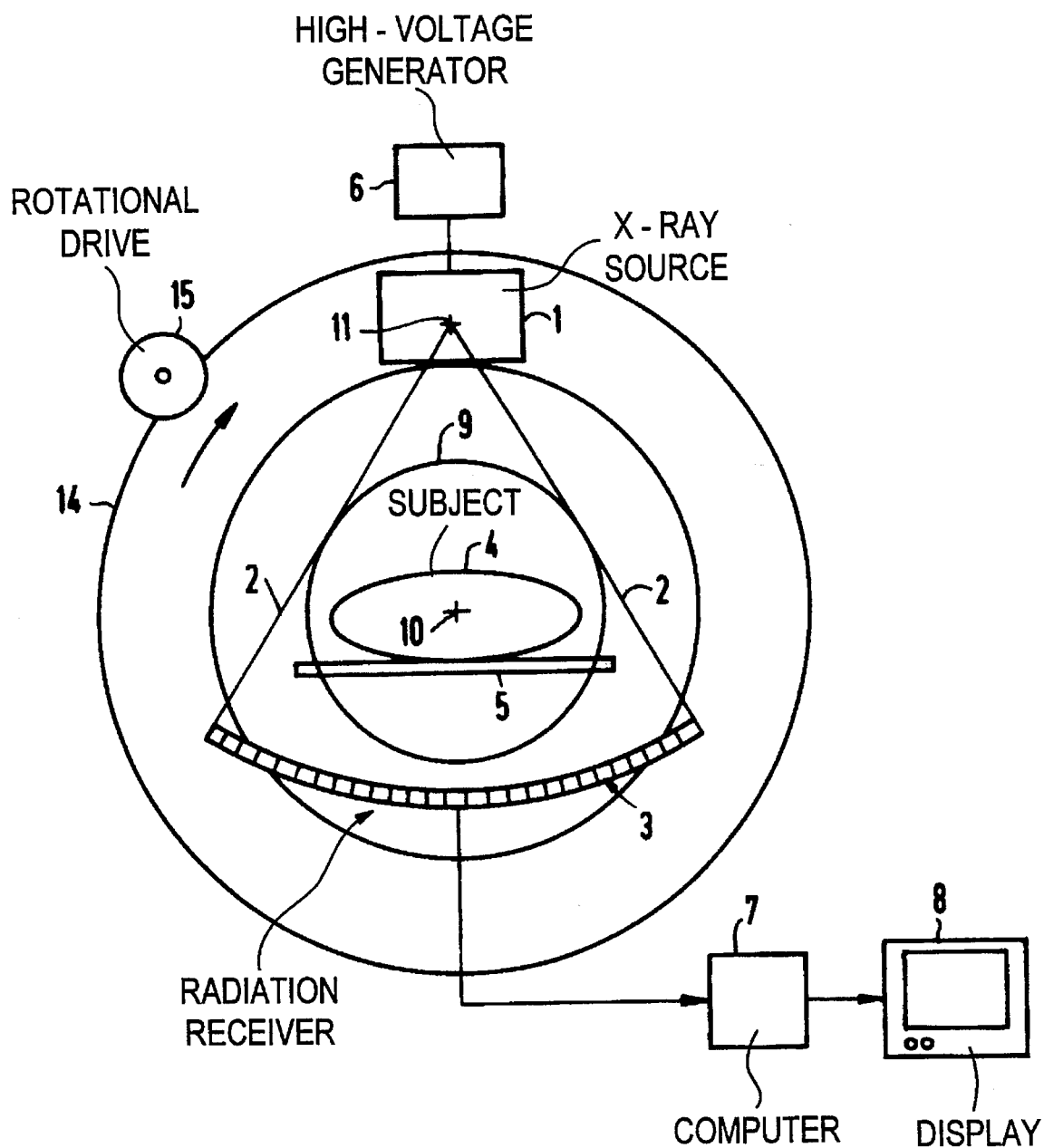

METHOD FOR IMAGE RECONSTRUCTION IN A COMPUTED TOMOGRAPHY APPARATUS

BACKGROUND OF THE INVENTION

1. Field of the Invention

The present invention is directed to a method for generating a displayable image from data obtained by irradiation of an examination subject in a computed tomography apparatus, and in particular to a method for image reconstruction suitable for use in such a computed tomography apparatus.

2. Description of the Prior Art

In computed tomography, CT images can be reconstructed by the linogram method. The linogram method was introduced by P. Edholm in 1987, see P. R. Edholm, G. T. Herman, "Linograms in Image Reconstruction from Projections,"IEEE Trans. on Med. Imag., vol. MI-6, No. 4, 1987, pp. 301–307. It is a special Fourier reconstruction method that functions entirely without interpolation in the frequency space. A disadvantage of the usual Fourier reconstruction method is that after the one-dimensional fast Fourier transformation of the measured projections $f_{lk}$, discrete spectrum values are defined on a polar grid. The transition to the Cartesian grid in the frequency space takes place by means of a two-dimensional interpolation, which leads to flawed images if insufficient care is taken. The essential idea of the linogram method is to organize discrete spectrum values on a "quasi-Cartesian" grid from the outset through suitable measures, so that interpolation in the frequency space is no longer necessary.

In the known linogram method, a spectrum is always generated that corresponds to the image in the overall measurement field with the diameter $D_M$. As in the direct Fourier transformation methods, this results in that a very large number of points must be reckoned with in the frequency space with matrices. In the original linogram method, spectral values with a fixed grid $$\Delta\rho_x = \frac{1}{4D_M}$$

result in the $\rho_x$ direction in the angle region [−45°, 45°] in the frequency space, while spectral values with a fixed grid $$\Delta\rho_y = \frac{1}{4D_M}$$

result in the $\rho_y$ direction in the angle region [45°, 135°] ($\rho_x$ and $\rho_y$ are the Cartesian frequency variables). If there are $N_p$=2048 projections in the angle region [−45°, 135°] with N=1024 measurement values per projection in the sampling grid $$a = \frac{D_M}{N},$$

this means that the two sub-matrices for [−45°, 45°] or [45°, 135°] in the frequency space each have $$4N \cdot \frac{N_P}{2} = 4096 \cdot 1024 \text{ points.}$$

If the method is to be of practical importance, it must be possible to reconstruct arbitrary eccentric image segments. For this purpose, in the known linogram method chirp-z transformations are undertaken on the desired image segment $D_B \cdot D_B$ with $N_{Pix} \cdot N_{Pix}$ image elements in the grid $$\Delta x = \Delta y = \frac{D_B}{N_{Pix}}$$

on the basis of the two sub-matrices, in both the $\rho_x$ and the $\rho_y$ directions. This step is so expensive in terms of processing outlay that it far outweighs the advantage of the lack of interpolation in the frequency space.

SUMMARY OF THE INVENTION

An object of the present invention is to provide a Fourier reconstruction method for image reconstruction for computed tomograph with which arbitrary eccentric image segments can be directly reconstructed.

This object is inventively solved in accordance with the principles of the present invention in a method which is a modified linogram reconstruction method, with which the problem of the representation of an eccentric segment of a CT image is solved with a greatly reduced expense. It is a combination of linogram and gridding methods (on gridding methods, see J. D. O'Sullivan, "A Fast Sinc Function Gridding Algorithm for Fourier Inversion in Computer Tomography,"IEEE Trans. on Med. Image., vol. MI-4, no. 4, 1985, pp. 200–207), with which it is possible to reconstruct arbitrary eccentric image segments directly. The matrix that thereby results in the frequency space has, instead of $$\Delta\rho_x = \frac{1}{4D_M}$$

or $$\Delta\rho_y = \frac{1}{4D_M}$$

as in the original linogram method, the frequency grid $$\Delta\rho_x = \Delta\rho_y = \frac{1}{2D_B}$$

($D_B$ is the side length of the desired image segment). In addition, the points lie on a Cartesian grid, not on the "quasi-Cartesian" grid of the linogram method. If the image consists of $N_{Pix} \cdot N_{Pix}$=512·512 image elements, then the Cartesian frequency matrix has $2N_{Pix} \cdot 2N_{Pix}$=1024·1024 points, independent of the choice of $D_B$. In contrast to the original, known gridding method, in the inventive method the gridding itself is only one-dimensional. The back-transformation of the spectrum into the spatial domain can be carried out with fast Fourier transformations; chirp-z transformations, as in the original linogram method, are not necessary.

DESCRIPTION OF THE DRAWINGS

FIG. 1 is a schematic illustration of a computed tomography apparatus wherein data are obtained, and an image reconstruction is undertaken, in accordance with the principles of the present invention.

DESCRIPTION OF THE PREFERRED EMBODIMENTS

The computed tomography apparatus shown in the drawing has a measurement unit consisting of an X-ray source 1, which emits a fan-shaped X-ray beam 2, and a radiation receiver 3, consisting of a row of individual detectors, e.g.

1024 individual detectors. The focus is designated 11. The patient 4 to be examined lies on a patient bed 5. For the scanning the patient 4, the measurement unit formed by the source 1 and the receiver mounted on a ring 14 3 is rotated through 360° around a measurement field 9 in which the patient 4 lies by a rotation drive 15. The axis of rotation is designated 10. The X-ray source 1, fed by a high voltage 6, is operated in a pulsed manner or with continuous radiation. At predetermined rotational angle positions of the measurement unit, sets of data are produced that are supplied from the receiver 3 to a computer 7, which calculates the attenuation coefficients of predetermined image points from the registered data sets and graphically reproduces the coefficients on a viewing apparatus 8. An image of the transilluminated layer of the patient accordingly appears on the viewing apparatus 8.

The starting point for the reconstruction is a parallel data set with $N_P$ projections in the angle area [−45°, 135°] and N channels per projection in the scanning grid a. If a CT scanner measures data in fan geometry, the parallel data are obtained by rebinning. If $f_{LK}$ is the measurement value at the projection l in the channel k, then:

$$\theta_l = -45° + l\Delta\theta_l, \quad l = 0, 1, 2, \ldots, N_P - 1 \tag{1}$$

$$p_k = (k - 0.5 + a_m)a \quad k = \ldots, -1, 0, 1, \ldots \tag{2}$$

wherein $a_m$ is the alignment factor.

Furthermore, $\Delta \tan \theta$ or $\Delta \cot \theta$ is constant:

$$\Delta \tan \theta = \frac{2}{N_P}(\tan(45°) - \tan(-45°)) = \frac{4}{N_P} \; ; \; -45° \leq \theta_l \leq 45° \tag{3}$$

$$\Delta \cot \theta = \frac{2}{N_P}(-\cot(135°) + \cot(45°)) = \frac{4}{N_P} \; ; \; 45° < \theta_l < 135° \tag{4}$$

The only image that can be calculated from these measurement values without additional assumptions is defined as follows:

$$B_0(\vec{r}) = \frac{2}{\pi^2 a} \sum_l \Delta\theta_l \sum_k f_{lk} L_0(\vec{r} \cdot \vec{n}_l - p_k) \tag{5}$$

Wherein $$\vec{n}_l = (\cos\theta_l, \sin\theta_l) \tag{6}$$

and $$L_0(p) = \frac{\pi^2 a^2}{2} \int |\rho| M_A(\rho) \exp(2\pi i \rho p) d\rho \tag{7}$$

wherein $M_A(\rho)$ is the modulation transfer function of the reconstruction.

Furthermore, one can set $$L_0(\vec{r} \cdot \vec{n}_l - p_k) = \sum_q L_C(p_q - p_k) L_S(\vec{r} \cdot \vec{n}_l - p_q) \tag{8}$$

$L_C$ and $L_S$ do not form the basis for restrictions as in a convolution back-projection reconstruction, where $L_C$ is the CT convolution kernel and $L_S$ is the interpolation function necessary in the back projection; however, $L_S$ is a smoothing function with little extension in the spatial domain.

The basic idea of the inventive method is to carry out the necessary convolution of the measurement values $f_{lk}$ with the CT convolution Kernel in the frequency space as a multiplication, and then to center the image in the desired reconstruction center $-\vec{r}_z$ as the new origin by means of multiplication by a phase factor. After the one-dimensional back-transformation of the measurement values into the spatial domain, the subsequently convoluted, centered projections can be limited to the desired image field $D_B$. This is followed by one-dimensional chirp-z transformations to the desired frequency grid $$\Delta\rho_x = \frac{1}{2D_B}$$

for the angle area [−45°, 45°], or $$\Delta\rho_y = \frac{1}{2D_B}$$

for the angle area [45°, 135°]. This is theoretically grounded below.

If the reconstruction center is chosen at $-\vec{r}_z$, one first forms $B_0(\vec{r} - \vec{r}_z)$ as:

$$B_0(\vec{r} - \vec{r}_z) = \frac{2}{\pi^2 a} \sum_l \Delta\theta_l \sum_k \sum_q f_{lk} L_C(p_q - p_k) L_S(\vec{r} \cdot \vec{n}_l - \vec{r}_z \cdot \vec{n}_l - p_q) \tag{9}$$

$$= \frac{2}{\pi^2 a} \sum_l \Delta\theta_l \sum_k \sum_q f_{lk} L_C(p_q - p_k - \vec{r}_z \cdot \vec{n}_l) L_S(\vec{r} \cdot \vec{n}_l - p_q)$$

Consider the convoluted, "centered" projections $$f_c(p_q, \theta_l) = \sum_k f_{lk} L_C(p_q - p_k - \vec{r}_z \cdot \vec{n}_l) \tag{10}$$

The function $f_c(p_q, \theta_l)$ can be periodically repeated without degrading the image in an area with diameter $D_M$ (now however centered around $-\vec{r}_z$), if for the period length w, $w \geq 2D_M = 2Na$ holds, and if $L_c(p)$ for $|p| > D_M$ is set to 0, i.e.

$$f_c'(p_q, \theta_l) = \sum_m \sum_k f_{lk} L_C(p_q - p_k - \vec{r}_z \cdot \vec{n}_l - mw) \tag{11}$$

If the image is to be reconstructed in a square centered around $-\vec{r}_z$ with side length $D_B \cdot D_B$, with $D_B \leq D_M$, then the function $f'_c(p_q, \theta_l)$ can be limited to this square through multiplication by a rectangular window $R_l(p_q)$, since values outside it do not contribute to the image. A rectangular window $R_l(p_q)$, with extension $v_l$ dependent on the angle of projection $\theta_l$, is chosen. This is possible as long as the following holds:

$$v_l \geq \frac{D_B}{\cos\theta_l} \quad -45° \leq \theta_l \leq 45° \tag{12}$$

$$v_l \geq \frac{D_B}{\sin\theta_l} \quad 45° \leq \theta_l \leq 135°$$

In particular, one can set $$v_l = 2D_B \cos\theta_l \quad -45° \leq \theta_l \leq 45°$$

$$v_l = 2D_B \sin\theta_l \quad -45° \leq \theta_l \leq 135° \tag{13}$$

The function $f'_c(p_q, \theta_l)$, limited to $v_l$ with the rectangular window $R_l(p_q)$ and convoluted with $L_S$, can be periodically repeated with period length $v_l$ without influencing the image in the square $D_B \cdot D_B$. This results in $$B_{LG}(\vec{r} - \vec{r}_z) = \frac{2}{\pi^2 a} \sum_l \Delta\theta_l \sum_m \sum_k \sum_q \sum_s \times \tag{14}$$

$$f_{lk} L_C(p_q - p_k - \vec{r}_z \cdot \vec{n}_l - mw) R_l(p_q) L_S(\vec{r} \cdot \vec{n}_l - p_q - sv_l)$$

The Fourier-transform $\hat{B}_{LG}(\rho_x, \rho_y)$ of $B_{LG}(\vec{r} - \vec{r}_z)$ is as follows:

$$\hat{B}_{LG}(\rho_x, \rho_y) = \frac{2}{\pi^2 a} \iint \Sigma \Delta\theta_l \Sigma \Sigma \Sigma \Sigma \times \quad (15)$$
$$f_{lk} L_C(p_q - p_k - \vec{r}_z \cdot \vec{n}_1 - mw) R_l(p_q) L_S(\vec{r} \cdot \vec{n}_1 - p_q - sv_l) \times$$
$$\exp(-2\pi i \rho_x x) \exp(-2\pi i \rho_y y) \times dx dy$$

As in the linogram method, $B_{LG}(\vec{r} - \vec{r}_z)$ is decomposed into a partial image $B_{LG,1}(\vec{r} - \vec{r}_z)$ with $-45° \leq \theta_l \leq 45°$ and into a partial image $B_{LG,w}(\vec{r} - \vec{r}_z)$ with $45° < \theta_l 135°$. All following considerations relate to $B_{LG,1}(\vec{r} - \vec{r}_z)$; for $B_{LG,2}(\vec{r} - \vec{r}_z)$ the results are similar.

With $\vec{r}_z \cdot \vec{n}_l = x_z \cos \theta_l + y_z \sin \theta_l$ and $$\Delta\rho = \frac{1}{w} = \frac{1}{2D_M},$$

the following holds:

$$\sum_m L_C(p_q - p_k - \vec{r}_z \cdot \vec{n}_l - mw) = \quad (16)$$

$$\Delta\rho \sum_m \hat{L}_C(m\Delta\rho) \exp(2\pi i m \Delta\rho (p_q - p_k - \vec{r}_z \cdot \vec{n}_l)) =$$

$$\frac{1}{2D_M} \sum_m \hat{L}_C\left(\frac{m}{2D_M}\right) \exp\left(-2\pi i \frac{m}{2D_M} p_k\right) \times$$

$$\exp\left(2\pi i \frac{m}{2D_M} p_q\right) \exp\left(-2\pi i \frac{m}{2D_M} (x_2 \cos\theta_l + y_2 \sin\theta_l)\right)$$

Likewise, with $\vec{r} \cdot \vec{n}_l = x \cos\theta_{l+y \sin\theta_l}$ and $$\Delta\rho_F^l = \frac{1}{v_l} = \frac{1}{2D_B \cos\theta_l},$$

one can write:

$$\sum_s L_S(\vec{r} \cdot \vec{n}_l - p_q - sv_l) = \Delta\rho_F^l \sum_s \hat{L}_S(s\Delta\rho_F^l) \exp(2\pi i s \Delta\rho_F^l (\vec{r} \cdot \vec{n}_l - p_q)) = \quad (17)$$

$$\frac{1}{2D_B \cos\theta_l} \sum_s \hat{L}_S\left(\frac{s}{2D_B \cos\theta_l}\right) \exp\left(-2\pi i \frac{s}{2D_B \cos\theta_l} p_q\right) \times$$

$$\exp\left(2\pi i \frac{s}{2D_B} (x + y \tan\theta_l)\right)$$

It thus follows for +e,cir B+hd LG,1+ee $(\rho_x, \rho_y)$:

$$\hat{B}_{LG,1}(\rho_x, \rho_y) = \frac{2}{\pi^2 a} \frac{1}{2D_M} \sum_l \frac{\Delta\theta_l}{2D_B \cos\theta_l} \sum_s \hat{F}_l\left(\frac{s}{2D_B \cos\theta_l}\right) \hat{L}_S\left(\frac{s}{2D_B \cos\theta_l}\right) \times \delta\left(\rho_x - \frac{s}{2D_B}\right) \delta\left(\rho_y - \frac{s}{2D_B} \tan\theta_l\right) = \quad (18)$$

$$\frac{2}{\pi^2 a} \frac{1}{2D_M} \sum_l \frac{\Delta\theta_l}{2D_B \cos\theta_l} \sum_s \hat{F}_l\left(\frac{s}{2D_B \cos\theta_l}\right) \hat{L}_S\left(\frac{s}{2D_B \cos\theta_l}\right) \times \delta\left(\rho_x - \frac{s}{2D_B}\right) \delta\left(\rho_y - \left(l - \frac{N_P}{4}\right) \frac{2s}{N_P D_B}\right)$$

with $$\hat{F}_l\left(\frac{s}{2D_B \cos\theta_l}\right) = \sum_q \sum_m \sum_k f_{lk} \exp\left(-2\pi i \frac{m}{2D_M} p_k\right) \times \hat{L}_c\left(\frac{m}{2D_M}\right) \exp\left(-2\pi i \frac{m}{2D_M} (x_z \cos\theta_l + y_z \sin\theta_l)\right) \times \quad (19)$$

$$\exp\left(2\pi i \frac{m}{2D_M} p_q\right) R_l(p_q) \exp\left(-2\pi i \frac{s}{2D_B \cos\theta_l} p_q\right)$$

$$\hat{F}_l\left(\frac{s}{2D_B \cos\theta_l}\right) \text{ can be illustrated as follows:}$$

$$\hat{f}_l\left(\frac{m}{2D_M}\right) = \sum_k f_{lk} \exp\left(-2\pi i \frac{m}{2D_M} p_k\right) \quad (20)$$

is the one-dimensional Fourier transform of the $f_{lk}$ to the grid $$\Delta p = \frac{1}{2D_M}.$$

In the frequency space, $$\hat{f}_l\left(\frac{m}{2D_M}\right)$$

is multiplied by the Fourier transform of the convolution Kernel, $$\hat{L}_C\left(\frac{m}{2D_M}\right),$$

and the phase factor $$\exp\left(-2\pi i \frac{m}{2D_M} (x_z \cos\theta_l + y_z \sin\theta_l)\right),$$

which controls the position of the reconstruction center. There then follows an FFT back into the spatial domain; this results in the convoluted projections $f'_c(p_q, \theta_l)$, centered around $-\vec{r}_z$:

$$f'_c(p_q, \theta_l) = \quad (21)$$
$$\sum_m \hat{f}_l\left(\frac{m}{2D_M}\right) \hat{L}_C\left(\frac{m}{2D_M}\right) \exp\left(-2\pi i \frac{m}{2D_M} (x_z \cos\theta_l + y_z \sin\theta_l)\right) \times$$
$$\exp\left(2\pi i \frac{m}{2D_M} p_q\right)$$

In the spatial domain, the $f'_c(p_q, \theta_l)$ are limited to the desired image field region $v_l = 2D_B \cos\theta_l$, i.e. to $$N_l = int\left(\frac{2D_B \cos\theta_l}{a} + 1\right) \quad (22)$$

values, through multiplication by $R_l(p_q)$, and are newly transformed in the frequency space to the grid $$\Delta\rho_F^l = \frac{1}{2D_B \cos\theta_l}$$

with a chirp-z transformation $$\hat{F}_l\left(\frac{s}{2D_B \cos \theta_l}\right) = \sum_q f_c(p_q, \theta_l) R_l(p_q) \exp\left(-2\pi i \frac{s}{2D_B \cos \theta_l} p_q\right) \quad (23)$$

The spectrum $\hat{B}_{LG,1}(\rho_x, \rho_y)$ is defined in the $\rho_x$ direction at discrete grid points $s\Delta\rho_x^{LG}$, with $$\Delta\rho_x^{LG} = \frac{1}{2D_B} \quad (24)$$

$B_{LG,1}(x,\rho_y)$ belongs to an image limited in the x direction with an ideal rectangular window width $2D_B$. The grid values $s\Delta\rho_x^{LG}$ can thus be used directly as starting points for the FFT in the x direction back into the spatial domain, without requiring an additional interpolation in the frequency space. As in the gridding method, a region of side length $D_R = 2D_B$ is thereby reconstructed. If the image $D_B \cdot D_B$, having 512·512 pixels is thereby represented, 1024 frequency values are necessary in the $\rho_x$ direction. If more frequency support points are present in the $\rho_x$ direction after the chirp-z transformation of the projections, because the maximum frequency contained in the convoluted projections is larger than the frequency that can be represented with the image matrix, the additional frequency points must be rearranged as aliasing components after the gridding in the $\rho_y$ direction (see below).

In the $\rho_y$ direction, the grid values are likewise equidistant; the grid depending on $s\Delta\rho_x^{LG}$ is $$\Delta\rho_y^{LG}(s) = \frac{2s}{N_P D_B} \quad (25)$$

As in the original linogram method, for each s, a chirp-z transformation to the desired pixel grid $\Delta y$ can now follow in the $\rho_y$ direction.

In order to avoid the costly chirp-z transformation with the grid $\Delta\rho_y^{LG}(s)$, which depends on $s\Delta\rho_x^{LG}$, it is desirable to carry out a one-dimensional interpolation in each column s of the frequency matrix in such a way that a frequency grid $\Delta\rho_y$ that is equal for all s results, i.e. a Cartesian matrix. In order for no image deterioration is to appear through this interpolation, it must be implemented as a one-dimensional "gridding." The basic idea for the choice of the interpolation function $\hat{T}(\rho_y)$ is to limit the image $B_{LG,1}(x,y)$ to the desired width $D_R$ conceptually through multiplication by a window function $T(y)$ in the y direction, so that no coverage errors occur during the periodic repetition of the image in the spatial domain caused by the spectrum sampling in the Cartesian coordinates. The limiting is not carried out in the spatial domain, but rather in the frequency space, as one-dimensional convolution in the $\rho_y$ direction of the image spectrum defined at discrete points $$\frac{s}{2D_B}, \left(l - \frac{N_P}{4}\right) \frac{2s}{N_P D_B}$$

with the Fourier-transform $\hat{T}(\rho_y)$ of T(y). The address calculations may thereby be simplified due to the equidistant starting points $s\Delta\rho_y^{LG}(s)$. The resulting spectrum, continuous in the $\rho_y$ direction, is then sampled at the grid points $j\Delta\rho_y$, with $\Delta\rho_y = 1/D_R$. In order to obtain the smallest possible extension of $\hat{T}(\rho)$ in the frequency space, and thereby as short a convolution as possible, the side length of the reconstruction field $D_R$ is chosen twice as large as the side length of the desired image field $D_B$. T(y) can then fall gently to a sufficiently small value in the area $D_B/2 \leq |y| \leq D_R - D_B/2$.

In the $\rho_x$ direction, no gridding is necessary, since here the Cartesian grid is already present. The image resulting from this spectrum through Cartesian sampling and two-dimensional Fourier back-transformation is identical with the convolution back-projection image in the desired image area up to aliasing errors in the spatial domain, which are caused by the finite extension of $\hat{T}$ in the frequency space. Through suitable choice of $\hat{T}$, these aliasing errors can be made negligibly small.

Through the convolution with $\hat{T}(\rho_y)$ in the frequency space, the image is multiplied by T(y) in the spatial domain, and thus has a "bump". This bump can easily be corrected by dividing the reconstructed image $B_{LG,1}(x,y)$ in the region $|y| \leq D_B/2$ by T(y). After the gridding and a possible rearrangement of the aliasing components, there are 1024 Cartesian values both in the $\rho_x$ direction and the $\rho_y$ direction, so that one obtains the partial image $B_{LG,1}(\vec{r} - \vec{r}_z)$ through two-dimensional back-transformation of 1024·1024 frequency points. The inner 512·512 pixels are the image that must be corrected in the y direction through multiplication by $$\frac{1}{T(y)}.$$

In the same way, but with x and y exchanged, the partial image $B_{LG,2}(\vec{r} - \vec{r}_z)$ is obtained from $$\hat{B}_{LG,2}(\rho_x, \rho_y) = \frac{2}{\pi^2 a} \frac{1}{2D_M} \sum_l \frac{\Delta\theta_l}{2D_B \sin\theta_l} \sum_s \hat{F}_l\left(\frac{s}{2D_B \sin\theta_l}\right) \hat{L}_S\left(\frac{s}{2D_B \sin\theta_l}\right) \times \delta\left(\rho_x - \left(l - \frac{3N_P}{4}\right) \frac{2s}{N_P D_B}\right) \delta\left(\rho_y - \frac{s}{2D_B}\right) \quad (26)$$

with $$\hat{F}_l\left(\frac{s}{2D_B \sin\theta_l}\right) = \sum_q \sum_m \sum_k f_{lk} \exp\left(-2\pi i \frac{m}{2D_M} p_k\right) \times \hat{L}_C\left(\frac{m}{2D_M}\right) \exp\left(-2\pi i \frac{m}{2D_M} (x_z \cos\theta_l + y_z \sin\theta_l)\right) \times \exp\left(2\pi i \frac{m}{2D_M} p_q\right) R_l(p_q) \exp\left(-2\pi i \frac{s}{2D_B \sin\theta_l} p_q\right) \quad (27)$$

Since this partial image must be corrected after the gridding and the back-transformation in the x direction, the spectra of $B_{LG,1}(\vec{r} - \vec{r}_z)$ and $B_{LG,2}(\vec{r} - \vec{r}_z)$ cannot simply be added and back-transformed together. Rather, each spectrum must be separately transformed into the spatial domain. The final image results from the sum of the two corrected partial images.

A summary of the invention processing step is as follows:

In the following, the necessary processing steps are shown for a third-generation CT apparatus with 1024 measurement values per projection and ~1200 fan projections in the region $[0, 2\pi]$ (e.g. Siemens SOMATOM AR/HP).

9

1.) Rebinning to parallel data $f_{lk}$:
N=1024 channels per projection, $N_p \approx 600$ projections with $\Delta\tan\theta$=const in the angle area [−45°, 45°] or $\Delta\cot\theta$=const in the angle area [−45°, 135°].

2.) Zero padding of the $f_{lk}$ and one-dimensional FFT of the $f_{lk}$ with 2048 values. Through the zero padding, the grid $$\Delta\rho = \frac{1}{2D_M}$$

results in the frequency space.

3.) Multiplication of the $\hat{f}_l(m\Delta\rho)$ with the Fourier transform of the convolution Kernel $\hat{L}_c(m\Delta\rho)$ and with the phase factor exp $(-2\pi i m\Delta\rho(x_z \cos\theta + y_z \sin\theta_l))$.

4.) FFT of length 2048 back into the spatial domain; limitation of each convoluted, centered projection $f'_c(p_q, \theta_l)$ to $$N_l = \text{int}\left(\frac{2D_B\cos\theta_l}{a} + 1\right)$$

values for −45°≦$\theta_l$≦45°, or to $$N_l = \text{int}\left(\frac{2D_B\sin\theta_l}{a} + 1\right)$$

values for 45°<$\theta_l$≦135°.

5.) One-dimensional chirp-z transformation of the bounded function $f'_c(p_q,\theta_l)$ to a maximum of 1024 frequency points in the grid $$\Delta\rho_F^l = \frac{1}{2D_B\cos\theta_l} \text{ or } \Delta\rho_F^l = \frac{1}{2D_B\sin\theta_l}.$$

The number of points depends on the size of the represented image segment and on the maximum frequency of the reconstruction.

6.) Multiplication of the $\hat{F}_l(s\Delta\rho_F^l)$ by the Fourier transform of the "smoothing Kernel" $\hat{L}_s(s\Delta\rho_F^l)$.

7.) Calculation of two sub-images for the angle areas [−45°, 45°] and [45°, 135°]: Sub-image 1: for each frequency value $s\Delta\rho_x$ in the $\rho_x$ direction, a gridding is carried out in the $\rho_y$ direction, on the basis of $N_P$ frequency support points in the s-dependent grid $\Delta\rho_y^{LG}(s)$, to 1024 values in the grid $$\Delta\rho_y = \frac{1}{2D_B}.$$

Since the matrix is complexly conjugate, only the positive s must be taken into account; at most there are thus ~1024·600 starting points. After the rearrangement of the aliasing components, a Fourier transformation of the 1024·1024 frequency values into the spatial domain follows; the inner 512·512 pixels are the image. Sub-image 2: proceed as for sub-image 1, with x and y exchanged.

8.) Correction and addition of the two sub-images.

Although modifications and changes may be suggested by those skilled in the art, it is the intention of the inventors to embody within the patent arranged hereon all changes and modifications as reasonably and properly come with the scope of their contribution to the art.

I claim as my invention:

1. A method for obtaining an image of a subject in a computed tomography apparatus comprising the steps of:

irradiating a subject with x-rays from a plurality of projections $p_k$ at respective projection angles $\theta_i$;

10 detecting said x-rays, attenuated by said subject, in a radiation detector having N detector channels to obtain data $f(p_k, \theta_l)$;

supplying said data $f(p_k, \theta_l)$ from the detector to a computer in a parallel beam geometry so that $\Delta\tan\theta$=const in an angle region [−45°, 45°] or $\Delta\cot\theta$=const in an angle region [45°, 135°], and $p_k$=(k−0.5+$a_m$)a (a is a sampling grid and $a_m$ is an alignment factor);

reconstructing a sectional image of said subject by the following steps:

one-dimensionally Fast Fourier transforming $f(p_k, \theta_l)$ relative to $p_k$, with $N_{FFT}\geq 2N$ values to obtain $\hat{f}_l(m\Delta\rho)$;

multiplying $\hat{f}_l(m\Delta\rho)$ by the Fourier transform of a convolution Kernel $\hat{L}_c(m\Delta\rho)$ and by a phase factor exp $(-2\pi i m\Delta\rho(x_z \cos\theta_l + y_z \sin\theta_l))$, which defines the position of the center of the sectional image to obtain frequency values on a polar grid;

conducting a Fast Fourier transformation of length $N_{FFT}$ of said frequency values on a polar grid back into the spatial domain to obtain a plurality of convoluted, centered projections $f'_c(p_q,\theta_l)$;

limiting each convoluted, centered projection $f'_c(p_q,\theta_l)$ to $$N_l = \text{int}\left(\frac{2D_B\cos\theta_l}{a} + 1\right)$$

values for −45°≦$\theta_l$≦45° or to $$N_l = \text{int}\left(\frac{2D_B\sin\theta_l}{a} + 1\right)$$

values for 45°<$\theta_l$≦135° to obtain a plurality of bounded projections $f'_c(p_q,\theta_l)$;

one-dimensionally chirp-z transforming each bounded projection $f'_c(p_q, \theta_l)$ to a grid $$\Delta\rho_F^l = \frac{1}{2D_B\cos\theta_l}, \text{ wherein } \Delta\rho_x = \frac{1}{2D_B} = \text{const},$$

for −45°≦$\theta_l$≦45° or $$\Delta\rho_F^l = \frac{1}{2D_B\sin\theta_l}, \text{ i.e. } \Delta\rho_y = \frac{1}{2D_B} = \text{const},$$

for 45°<$\theta_l$≦135°, whereby the number of points is dependent on the size of the represented image segment and on the maximum frequency of reconstruction to obtain projections $\hat{F}_l(s\Delta\rho_F^l)$ by the Fourier transform of a smoothing Kernel $\hat{L}_s(s\Delta\rho_F^l)$;

calculating first and second sub-images respectively for the angle regions [−45°, 45°] and [45°, 135°];

calculating said first sub-image by, for each frequency values $s\Delta\rho_x$ in the $p_x$ direction, interpolating said values with $\hat{T}(\rho_y)$ in the $\rho_y$ direction, using the gridding method on the basis of $N_P$ frequency support points in an s-dependent grid $\Delta\rho_y^{LG}(s)$, to $2N_{Pix}$ values in a grid $$\Delta\rho_y = \frac{1}{2D_B}$$

($N_{Pix}$) is a number of pixels in one column of the sectional image) rearranging aliasing components, and Fourier transforming the $2N_{Pix} \cdot 2N_{Pix}$ frequency values in the spatial domain and correcting inner $N_{Pix} \cdot N_{Pix}$ pixels in the y direction by multiplication with 1/T(y);

calculating said second sub-image by, for each frequency value $s\Delta\rho_y$ in the $\rho_y$ direction, interpolating said values with $\hat{T}(\rho_x)$ in the $\rho_x$ direction, using the gridding method on the basis of $N_P$ frequency support points in an s-dependent grid $\Delta\rho_x^{LG}(s)$, to $2N_{Pix}$ values in a grid $$\Delta\rho_x = \frac{1}{2D_B}$$

($N_{Pix}$ is a number of pixels in one column of the sectional image) rearranging aliasing components, and Fourier transforming the $2N_{Pix} \cdot 2N_{Pix}$ frequency values in the spatial domain and correcting inner $N_{Pix} \cdot N_{Pix}$ pixels in the x direction by multiplication with 1/T(x); and adding said first and second sub-images.

* * * * *